US008626466B2

United States Patent
Hackett, III et al.

(10) Patent No.: US 8,626,466 B2
(45) Date of Patent: Jan. 7, 2014

(54) FLOW METER VALIDATION (75) Inventors: Daniel J. Hackett, III, Houston, TX (US); Charles W. Derr, Spring, TX (US); Graham W. Forbes, Houston, TX (US); Kerry D. Groeschel, Houston, TX (US); Henry C. Straub, Jr., Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 690 days.

(21) Appl. No.: 12/703,963

(22) Filed: Feb. 11, 2010

(65) Prior Publication Data

US 2011/0196624 A1    Aug. 11, 2011

(51) Int. Cl.
*G01F 1/12* (2006.01)

(52) U.S. Cl.
USPC ........................................... 702/100

(58) Field of Classification Search
USPC ........................................... 702/100
See application file for complete search history.

(56) References Cited

U.S. PATENT DOCUMENTS

| 4,481,503 A | 11/1984 | Lehman et al. |
| 4,570,217 A | 2/1986 | Allen et al. |
| 4,571,993 A | 2/1986 | St. Onge |
| 4,794,553 A | 12/1988 | Watanabe et al. |
| 5,369,603 A | 11/1994 | Myers |
| 5,506,791 A * | 4/1996 | Hungerford et al. ............ 702/50 |
| 5,581,677 A | 12/1996 | Myers et al. |
| 5,739,823 A | 4/1998 | Akaza et al. |
| 5,999,106 A | 12/1999 | Buckler |
| 6,326,962 B1 | 12/2001 | Szabo |
| 6,611,203 B2 | 8/2003 | Whitmore et al. |
| 7,027,051 B2 | 4/2006 | Alford, Jr. et al. |
| 7,403,837 B2 | 7/2008 | Graiger et al. |
| 2002/0080181 A1 | 6/2002 | Razdow et al. |
| 2002/0134171 A1* | 9/2002 | Champness ................ 73/861.71 |
| 2003/0214537 A1 | 11/2003 | Lynn |
| 2005/0005711 A1 | 1/2005 | Gysling et al. |
| 2005/0195194 A1 | 9/2005 | Cummings |
| 2006/0201430 A1 | 9/2006 | Davis |
| 2007/0165031 A1 | 7/2007 | Gilbert et al. |
| 2008/0082215 A1 | 4/2008 | McDowell |
| 2009/0035121 A1 | 2/2009 | Watson et al. |

FOREIGN PATENT DOCUMENTS

| EP | 0762292 A2 | 12/1997 |
| WO | 01/09569 A1 | 2/2001 |
| WO | 2005/093531 A2 | 8/2005 |

OTHER PUBLICATIONS

Kitplanes, Nov. 2007, 2 pages.
PCT/US2011/024363 International Search Report & Written Opinion dated Oct. 20, 2011 (8 pages).

\* cited by examiner

*Primary Examiner* — Aditya Bhat
(74) *Attorney, Agent, or Firm* — Conley Rose, P.C.

(57) ABSTRACT

Flow meter validation techniques are herein disclosed. An illustrative system includes a flow meter and display logic coupled to the flow meter. The flow meter is configured to provide information indicative of a parameter of fluid flow through the meter. The display logic is configured to provide a display of the information. The display includes an indication of a possible range of values of the parameter. An indication of a baseline portion of the range is also provided. The baseline portion of the range designates preferred values of the parameter. The display further includes an indicator designating the value of the parameter.

20 Claims, 5 Drawing Sheets

FLOW METER VALIDATION

BACKGROUND

After hydrocarbons have been removed from the ground, the fluid stream (e.g., crude oil, natural gas) is transported from place-to-place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable, and in these situations flow meters may be used.

Ultrasonic flow meters are one type of flow meter that may be used to measure the amount of fluid flowing in a pipeline. In an ultrasonic flow meter, ultrasonic signals are sent back and forth across the fluid stream to be measured, and based on various characteristics of the ultrasonic signals, a fluid flow may be calculated. The accuracy of an ultrasonic flow meter is subject various conditions that affect the calibration and/or operation of the meter. For example, accumulation of contaminants in the pipeline, flow restrictions, and/or differences in calibration versus operation environment may affect flow meter accuracy.

Accordingly, effective techniques for monitoring conditions related to flow meter accuracy are desirable.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " In addition, the term "couple" or "couples" is intended to mean either an indirect or a direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. Further, the various embodiments were developed in the context of measuring hydrocarbon flows (e.g., crude oil, natural gas), and the description follows from the developmental context; however, the systems and methods described are equally applicable to measurement of any fluid flow (e.g., cryogenic substances, water).

A flow meter is used to measure the quantity of fluid flowing through a pipeline. The flow meter may be calibrated in a laboratory and thereafter considered to measure flow accurately under lab conditions. When the meter is installed for use in the pipeline, it is desirable to know whether the calibration has shifted. Shifts in calibration may be due to, for example, installation effects or gradual changes in the flow environment such as accumulation of dirt or other contaminants in the pipeline. Unfortunately, it may be difficult to identify a shift in calibration based on historical meter data. Embodiments of the present disclosure allow a user to quickly and effectively validate flow meter performance based on a comparison of current meter performance parameters to pre-determined desired parameter limits.

Figure 1A:
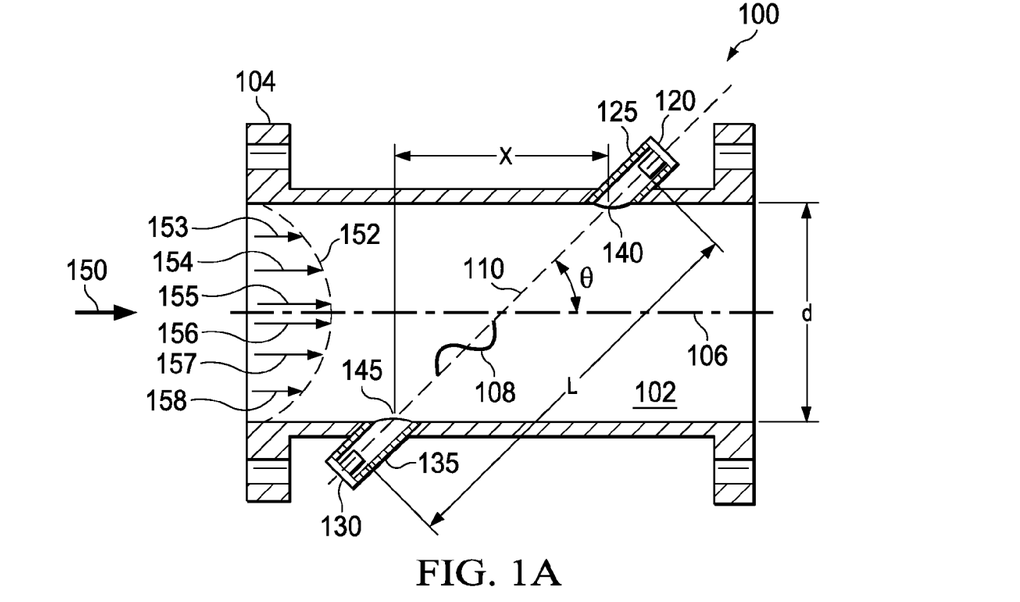
FIG. 1A shows a cross-sectional view of a flow meter in accordance with various embodiments.

FIG. 1A shows a cross-sectional view of an acoustic flow meter 100 in accordance with various embodiments. A meter body or spool piece 104, suitable for placement between sections of a pipeline, has a predetermined size and defines a central passage 102 through which a measured fluid (e.g., natural gas) flows. An illustrative pair of transducers 120 and 130, and their respective housings 125 and 135, are located along the length of spool piece 104. Transducers 120 and 130 are acoustic transceivers, and more particularly ultrasonic transceivers, meaning that they both generate and receive acoustic energy having frequencies of above about 20 kilohertz. The acoustic energy may be generated and received by a piezoelectric element in each transducer. To generate an acoustic signal, the piezoelectric element is stimulated electrically by way of a sinusoidal signal, and the element responds by vibrating. The vibration of the piezoelectric element generates the acoustic signal that travels through the measured fluid to the corresponding transducer of the transducer pair. Similarly, upon being struck by acoustic energy (i.e., the acoustic signal and other noise signals), the receiving piezoelectric element vibrates and generates an electrical signal that is detected, digitized, and analyzed by electronics associated with the meter 100.

A path 110, sometimes referred to as a "chord" or a "chordal pathway", exists between illustrative transducers 120 and 130 at an angle θ to a centerline 106. The length of chord 110 is the distance between the face of transducer 120 and the face of transducer 130. Points 140 and 145 define the locations where acoustic signals generated by transducers 120 and 130 enter and leave fluid flowing through the spool piece 104 (i.e., the entrance to the spool piece bore). The position of transducers 120 and 130 may be defined by the angle θ, by a first length L measured between transducers 120 and 130, a second length X corresponding to the axial distance between points 140 and 145, and a third length "d" corresponding to the pipe inside diameter. In most cases distances d, X and L are precisely determined during meter 100 fabrication. Further, transducers such as 120 and 130 are placed a specific distance from points 140 and 145, respectively, regardless of meter size (i.e., spool piece size). A fluid, (e.g., natural gas) flows in a direction 150 with a flow velocity profile 152. Velocity vectors 153-158 illustrate that in some cases the fluid velocity through spool piece 104 increases toward the centerline 106 of the spool piece 104.

Initially, downstream transducer 120 generates an acoustic signal that propagates across the fluid in the spool piece 104, and is then incident upon and detected by upstream transducer 130. A short time later (e.g., within a few milliseconds), the upstream transducer 130 generates a return acoustic signal that propagates back across the fluid in the spool piece 104, and is then incident upon and detected by the downstream transducer 120. Thus, the transducers 120 and 130 play "pitch and catch" with acoustic signals 108 along chordal path 110. During operation, this sequence may occur thousands of times per minute.

The transit time of the acoustic signal 108 between transducers 120 and 130 depends in part upon whether the acoustic signal 108 is traveling upstream or downstream with respect to the fluid flow. The transit time for an acoustic signal traveling downstream (i.e., in the same direction as the fluid flow) is less than its transit time when traveling upstream (i.e., against the fluid flow). The upstream and downstream transit times can be used to calculate the average flow velocity of the fluid along and/or proximate to the chord, and the transit times can be used to calculate speed of sound in the measured fluid.

Figure 1B:
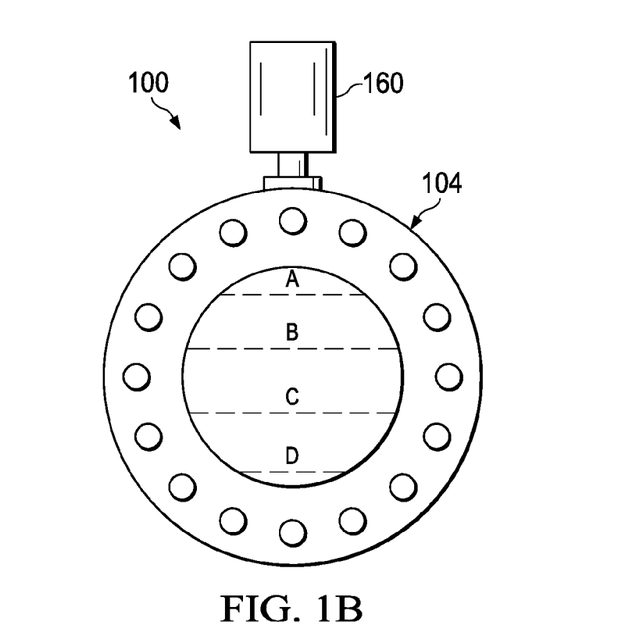
FIG. 1B shows an elevation end view of a flow meter in accordance with various embodiments.

Acoustic flow meters can have one or more chords. FIG. 1B illustrates an elevational end view of one end of a multi-path acoustic flow meter in accordance with various embodiments. The flow meter of FIG. 1B comprises four chordal pathways A, B, C and D at varying levels within the spool piece 104. In particular, chord A is an upper-most chord, chord B is an upper-middle chord, chord C is the lower-middle chord, and chord D is the lower-most chord. Each chordal path A-D corresponds to a transducer pair behaving alternately as a transmitter and receiver. Control electronics enclosure 160 is also shown, within which control electronics reside that acquire and process the data from the illustrative four chordal pathways A-D. Hidden from view in FIG. 1B, because of the flange, are the four pairs of transducers and transducer ports that correspond to chordal pathways A-D.

Figure 1C:
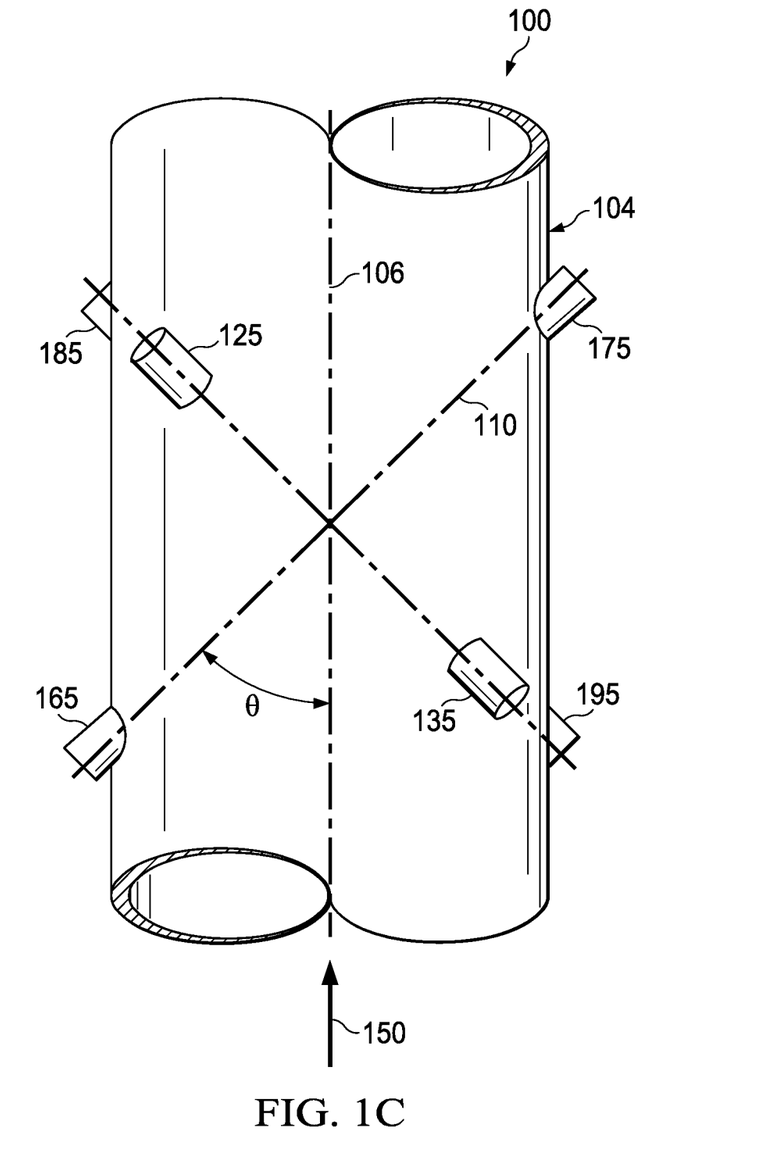
FIG. 1C shows an overhead view of a flow meter in accordance with various embodiments.

FIG. 1C shows an overhead view of the flow meter 100 to illustrate another aspect of the relationship of the chordal pathways. A first pair of transducer ports 125 and 135 (which may correspond to the upper-most chord, chord A) comprises transducers which define a chordal pathway at a non-perpendicular angle θ to centerline 106 of spool piece 104. Another pair of transducer ports 165 and 175 (which may correspond to upper-middle chord, chord B) comprises transducers which define a chordal pathway that loosely forms the shape of an "X" with respect to the chordal pathway of transducer ports 125 and 135. Similarly, a third pair of transducer ports 185 and 195 (which may correspond to the lower-middle chord, chord C) likewise comprises transducers which define a chordal pathway parallel to the chordal pathway for transducer ports 125 and 135, but lower in the central passage than the chordal pathway for either transducer ports 125 and 135 or transducer ports 165 and 175. Not explicitly shown in FIG. 1C, because of the curvature of the illustrative spool piece 104, is a fourth pair of transducer ports (which may correspond to the lower-most chord, chord D) that comprises transducers which define a chordal pathway parallel to the chordal pathway for transducer ports 165 and 175.

Taking FIGS. 1B and 1C together, the pairs of transducers are arranged such that the upper two pairs of transducers corresponding to chords A and B form the shape of an "X", and the lower two pairs of transducers corresponding to chords C and D also form the shape of an "X". The flow meter 100 determines the velocity of the gas proximate to each chord A-D to obtain chordal flow velocities, and the chordal flow velocities are combined to determine an average flow velocity across the entire central passage. From the average flow velocity and the cross-sectional area of the central passage, the amount of gas flowing in the spool piece, and thus the pipeline, may be determined. Changes in the post-calibration flow environment can affect flow meter 100 performance. Therefore, embodiments of the present disclosure include flow meter 100 validation that allows for efficient verification of flow meter performance.

Figure 2:
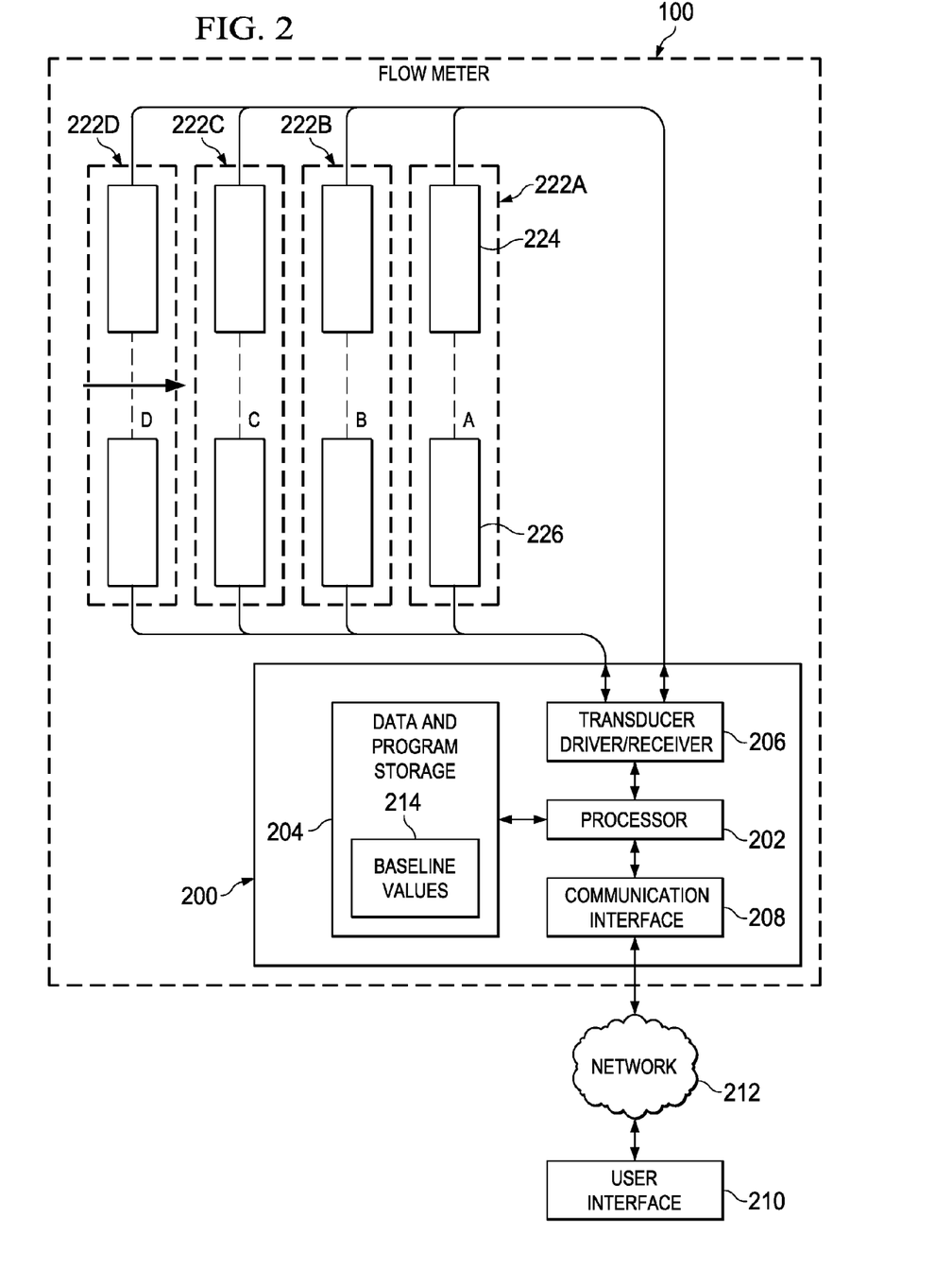
FIG. 2 shows a block a diagram of a system including flow meter validation in accordance with various embodiments.

FIG. 2 shows a block a diagram of a system including flow meter validation in accordance with various embodiments. The flow meter 100 control electronics 200 may reside within an electronics enclosure (e.g., enclosure 160 of FIG. 1B), which may couple to the spool piece 104. Alternatively, the electronics enclosure 160 may be equivalently mounted proximate (e.g., within a few feet) of the spool piece. The control electronics 200 include a processor 202, a data and program storage module 204, a transducer driver/receiver 206, and a communication interface 208.

The processor 202 is the device within which programs execute to perform meter 100 operations. The processor 202 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The data and program storage module 204 provides storage for software programming and/or data values related to the various operations of the meter 100 (e.g., performing flow measurements), and is coupled to and accessible by the processor 202. The data and program storage 204 is a computer-readable medium and may be, for example, volatile or non-volatile semiconductor memory, optical storage, or magnetic storage. Baseline values 214 that define preferred ranges for various flow parameters may be stored in the storage module 204.

Processor 202 also couples to and controls the transducer driver/receiver module 206 in order to send and receive acoustic signals through the measured fluid. In some embodiments, the driver/receiver module 206 includes an oscillator circuit and an amplifier circuit. In embodiments in which the driver/receiver module 206 has an internal oscillator, the driver portion of the driver/receiver module 206 creates an initial signal, amplifies the signal to sufficient signal strength to drive a transducer, and provides impedance matching with respect to the transducers. In other embodiments, the driver/receiver module 206 receives an alternating current (AC) signal of the desired frequency from the processor 202, amplifies the signal and provides impedance matching with respect to the transducers. The receiver portion of the driver/receiver module 206 likewise may take many forms. In some embodiments, the driver/receiver module 206 includes an analog-to-digital converter that takes the analog waveform created by a transducer representative of the received acoustic energy, and converts the signal to digital form. In some cases, the driver/receiver module 206 may filter and/or amplify the signals prior to or after digitization. The digitized version of the received signal may then pass to the processor 202 for purposes of determining fluid flow and ascertaining meter 100 operational parameters.

The processor 202, executing a program retrieved from storage 204, controls the transducer driver/receiver 206 to drive the each transducer 224, 226 of each transducer pair 222 to create an acoustic signal and to receive the electrical signal created by the transducer in response to the acoustic energy. In some embodiments, the processor 202, within the span of an illustrative one-second measurement period, directs each transducer pair to send approximately 30 upstream acoustic signals and 30 downstream acoustic signals. Greater or fewer sets of upstream and downstream acoustic signals for each transducer pair, and longer or shorter measurement periods, may be equivalently used.

Still referring to FIG. 2, transducer pair 222A is representative of all the transducer pairs 222. For purposes of this discussion, transducer 224 is the sending transducer, and transducer 226 is the receiving transducer; however, in actual operation these roles change alternately. Under control of the processor 202, an electrical signal generated and/or amplified by the transducer driver/receiver 206 propagates to and excites a piezoelectric element in transducer 224, and in turn transducer 224 generates an acoustic signal. The acoustic signal traverses the distance between transducer 224 and transducer 226 in the measured fluid. The transducers 224, 226 are substantially coaxial, as illustrated in FIG. 1A (see transducers 120, 130). Transducer 226 receives the acoustic energy (i.e., acoustic signal and noise signals), and an electrical signal corresponding to the received acoustic energy propagates to the transducer driver/receiver 206, and thereafter to the processor 202.

The communication interface 208 is coupled to the processor 202, and is the mechanism by which the meter 100 communicates with other devices, such as the user interface 210. The communication interface 208 may provide for communication via any of a variety of physical and logical communication protocols. For example, the communication interface may implement RS-232, RS485, IEEE 802.11, Ethernet, Bluetooth, or other physical or logical protocols.

In some embodiments, the meter 100 communicates with the user interface 210 via a network 212. The network 212 may be any of a variety of communication interconnects that provide for communication between different devices. For example, the network 212 may be the internet, a local area network, a wide area network, a point-to-point connection, etc.

The user interface 210 provides for monitoring and control of the meter 100. In some embodiments, the user interface 210 is a computer device, for example, a desktop or laptop personal computer configured to communicate with the meter 100. In embodiments of the present disclosure, the user interface 210 is configured to facilitate validation of meter 100 performance. More specifically, the user interface 210 may direct the meter 100 to acquire and/or store limit values indicative of preferred ranges of meter 100 operational parameters (i.e., baseline values 214). Based on the stored limits and measured parameter values provided by the meter 100, the user interface 210 generates a validation display that allows a user to quickly and effectively determine the operational health of the meter 100.

Figure 3:
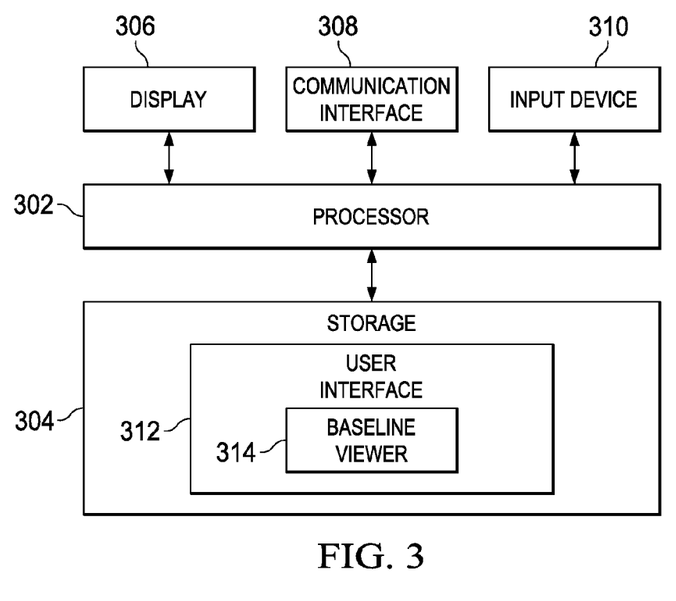
FIG. 3 shows a block diagram of a user interface device configured for flow meter validation in accordance with various embodiments.

FIG. 3 shows a block diagram of the user interface device 210 in accordance with various embodiments. The user interface device 210 includes a processor 302, a storage device 304, an input device 310, a communication interface 308, and a display 306. The user interface device 210 may include various other components, for example, graphics adapters, chipsets (northbridge/southbridge), audio processors, etc., omitted from FIG. 3 as a matter of simplification.

The processor 302 executes software instructions to perform user interface 210 operations. The processor 302 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The communications interface 308 is coupled to the processor 302, and is the mechanism by which the user interface 210 communicates with the meter 100. The communication interface 308 may provide for communication via any of a variety of physical and logical communication protocols. For example, the communication interface may implement RS-232, RS485, IEEE 802.11, Ethernet, Bluetooth or other physical or logical protocols. The communications interface 308 allows the user interface 210 to provide control information to the meter 100, and to receive operational information therefrom.

The input device 310 is coupled to the processor 302, and allows a user to enter data and/or make selections that control the operation of the user interface 210 and/or control the operation of the meter 100. The input device 310 may be a keyboard, mouse, trackball, touchpad, touchscreen, etc.

The display 306 provides visual output of information to a user, and is coupled to and controlled by the processor 302. In embodiments of the present disclosure, the processor 302 drives the display 306 to provide text and graphics allowing a user to determine the operational status of the meter 100. The display 306 may be a cathode ray tube display, a liquid crystal display, an organic light emitting diode display, a plasma display, an electroluminescent display, a projection display, etc.

The storage device 304 provides storage for software programming and/or data values related to the various operations of the user interface 210 (e.g., generating a baseline viewer display to facilitate meter 100 validation as explained below), and is coupled to and accessible by the processor 302. The storage device 304 is a computer-readable medium and may be, for example, volatile or non-volatile semiconductor memory (e.g., random-access, read-only, Flash memory), optical storage (e.g., compact-disc, digital video disc, blue-ray disc, etc.) or magnetic storage (hard drives, floppy drives, etc.)

Software programming stored in the storage device 304 may include meter user interface software 312 and baseline viewer software 314. The meter user interface software 312, when executed by the processor 302, establishes communication with the meter 100 via network 212 and allows a user to monitor meter 100 operation, by receiving activity information from the meter, and to control meter 100 operation, for example, by setting operational parameters in the meter 100. In order to facilitate validation of meter 100 operation, at least some embodiments of the user interface software 312 allow a user to program baseline parameter values 214 into the meter 100. The baseline parameter values 214 establish preferred values of the associated parameters. An offset about the baseline may also be programmed into the meter 100, via the user interface 210, to establish upper and lower limits of a preferred range for each parameter. In some embodiments, the user interface software 312 may direct the meter to establish a baseline value 214 based on current or historical values of the parameter associated with the baseline. For example, the user interface 210 may direct the meter 100 to set the baseline value 214 for a parameter to an average of values measured for the parameter by the meter 100 over a specified interval. In some embodiments, the user may provide the baseline values 214 via entry from the input device 310. Different baseline values 214 and/or offset values may be set for each operational parameter. Additionally, different baseline values 214 and/or offset values may be set for each operational parameter with regard to forward and reverse directions of fluid flow.

Embodiments include a baseline viewer software module 314 as a component of the user interface software 312. The baseline viewer software 314, when executed by the processor 302, retrieves various operational parameters from the meter 100, and creates, on the display device 306, a validation display including the retrieved parameters. The display generated by the baseline viewer software 314 facilitates assessment of meter 100 health and flow measurement accuracy by presenting various meter operational parameters in the context of the baseline limit values 214 established for the parameters.

Figure 4:
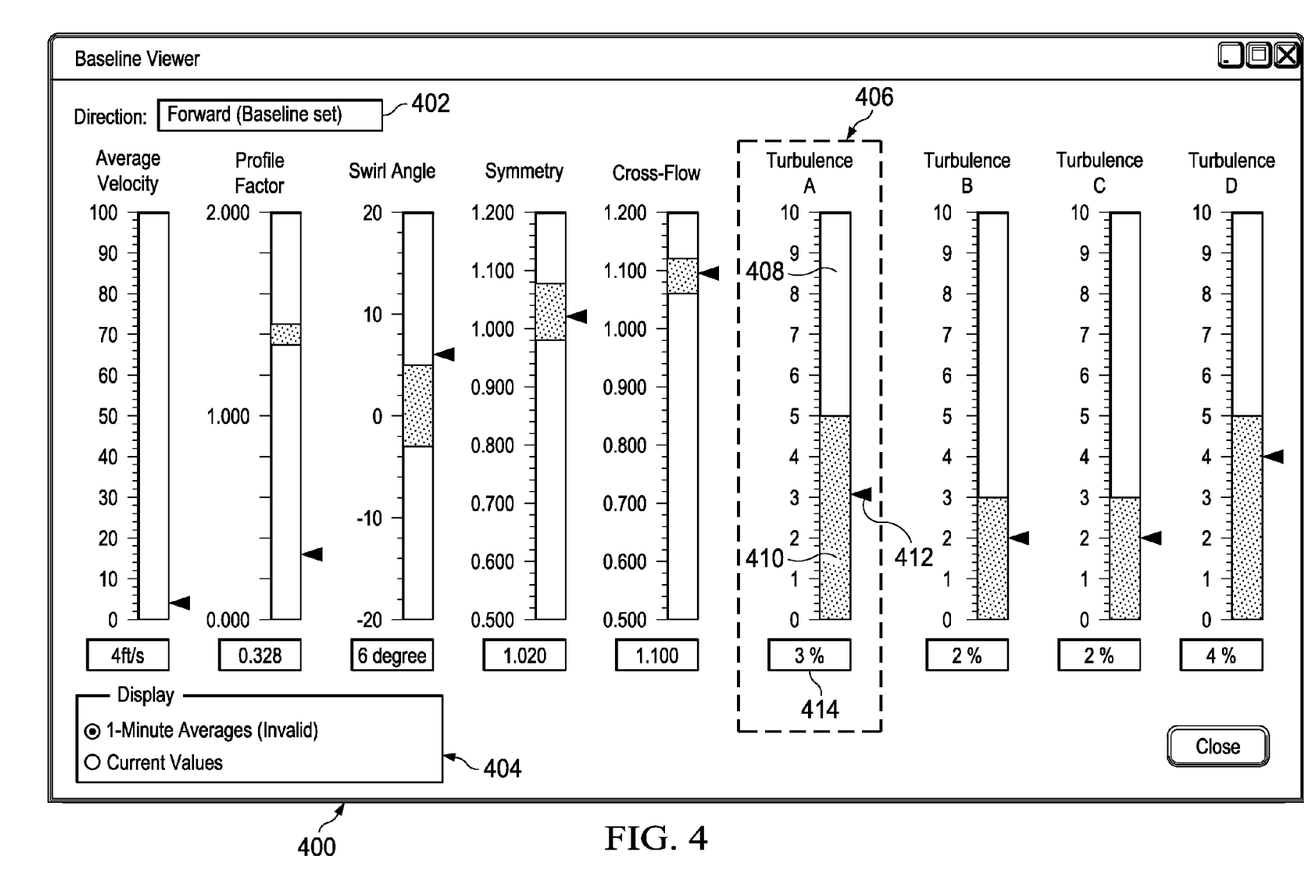
FIG. 4 shows an exemplary display of flow meter validation information in accordance with various embodiments.

FIG. 4 shows an exemplary baseline viewer display 400 of flow meter validation information as provided by the processor 302 executing the baseline view software 314 in accordance with various embodiments. The various parameter and baseline values presented in the display are based on information received from the meter 100. Field 402 provides an indication of the direction of fluid flow through the meter 100 (e.g., forward or reverse), and indicates whether baseline values (as described above) for the displayed flow direction have been programmed into the meter 100. As described above, different baseline values may be associated with a parameter for forward and reverse fluid flow.

For each of a set of selected flow meter 100 parameters, a gauge 406 is displayed. Each gauge shows a range of possible values for the parameter. For example, gauge 406 assigned to the parameter "Turbulence A," shows a range of 0 to 10 percent as indicated by graduation marks disposed along the gauge. Within the range of possible values, a baseline range (or baseline limits) 410 identifying a preferred range of values for the parameter is presented. For the parameter "Turbulence A," the baseline range 410 is shown as 0 to 5 percent. The displayed baseline range 410 is based on baseline values 214 transmitted to the user interface 210 by the meter 100. An indicator 412 shows the value of the parameter received from the meter 100. For the parameter "Turbulence A," the indicator 412 shows the value to be 3%. A field 414 associated with each gauge displays the numeric value of the parameter. By viewing the parameter value indicators 412 in relation to the established baseline limits 410, a user can readily determined whether meter 100 operational parameters have drifted outside of a preferred range of values.

In some embodiments, each gauge 406 is presented as a rectangle of a first color representing the range of possible parameter values, overlayed by a smaller rectangle of a second color representing the baseline range for the parameter. Graduation marks along one side of the larger rectangle denote the scale of the parameter value, and the indicator is positioned along the side of the larger rectangle opposite the graduation marks. Some embodiments may provide a different gauge implementation.

The parameters presented in the baseline viewer display are indicative of meter 100 health. Accordingly, the baseline viewer display 400 facilitates identification of conditions affecting flow measurement. Some embodiments of the baseline viewer display 400 include the parameters described below. Some embodiments of the baseline viewer display may include different parameters and/or a different number of parameters.

"Avg Velocity" is the average velocity of fluid flow through the meter 100.

"Profile Factor" is the ratio of the sum of the flow velocities associated with the inner cords (see FIGS. 1B, B & C) to the sum of the flow velocities associated with the outer chords (see FIGS. 1B, A & D).

"Swirl Angle" is a description of the amount of flow that is tangential to the inner wall of spool piece 104. The tangential flow velocity is estimated from deviations of the chordal flow velocities from their ideal values and the swirl angle is given by the arctangent of the ratio of estimated tangential flow velocity to average flow velocity.

"Symmetry" is a comparison of the upper chord (A & B) velocities to the lower chord (C & D) velocities.

"Cross-Flow" compares the flow velocities from one side of the meter to the flow velocities from the other side of the meter. For example, cross-flow may be computed as the ratio of the sum of chord A and C flow velocities to the sum of chord B and D flow velocities.

"Turbulence A" is an estimate of the standard deviation of the delta time of chord A as a percentage of the delta time where the delta time is the difference between the upstream transit time and the downstream transit time for chord A. Turbulence B, C, and D are the equivalent standard deviation estimates for each of chords B, C, and D respectively.

The parameter value presented by the indicator 412 and the numeric display 414 may denote either an average value for the parameter computed over a predetermined interval, or a current/instantaneous value for the parameter. The field 404 of the baseline viewer dialog 400 allows a user to select between average and current parameter values for display. The averaging interval may be selected to reduce the affects of short-term measurement variations on the parameter display. In some embodiments, the averaging interval is set to one minute as shown. An indication of the validity of the parameter averages is also provided.

Figure 5:
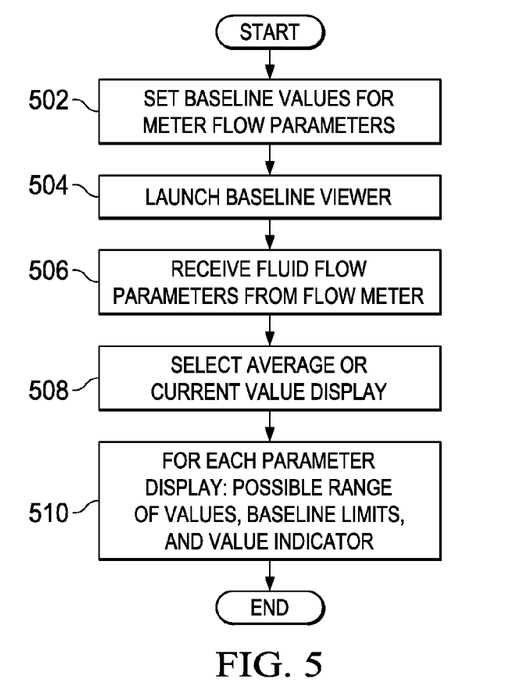
FIG. 5 shows a flow diagram for a method of providing flow meter validation in accordance with various embodiments.

FIG. 5 shows a flow diagram for a method of providing flow meter validation in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 5, as well as other operations described herein, can be implemented as instructions stored in a computer readable medium and executed by a processor.

In block 502, the meter 100 and the user interface 210 are operating and communication between the two has been established. The user interface 210 directs the meter 100 to initialize the baseline values 214 for various meter 100 parameters. The user interface 210 may receive the baseline values 214 via user entry through the input device 310 and transfer the values 214 to the meter via the network 212. Alternatively, the user interface 210 may direct the meter to set the baseline values 214 based on values of the parameters acquired by the meter 100 during operation. The user interface 210 may also provide an offset value for each parameter to establish a range of preferred values based on the baseline value. For example, if the swirl angle baseline value is set to zero degrees, an offset of five can be used to set the baseline limits from −5 to +5 degrees (see FIG. 4). The user interface 210 may receive the baseline offset values via user entry through the input device 310 and transfer the values to the meter 100 via the network 212.

In block 504, the processor 302 executes the baseline viewer software 314 and a baseline viewer display 400 is generated on the display device 306.

In block 506, the user interface 210 receives fluid flow parameter information from the flow meter 100. The information received includes the baseline limit values 214 previously programmed into the meter 100, and values of parameters associated with the baseline limits 214 measured by the meter 100. In some embodiments, the parameters received for display by the baseline viewer include at least some of average flow velocity, profile factor, swirl angle, symmetry, cross-flow, and chord turbulence.

In block 508, either of average or current/instantaneous parameter values is selected for presentation on the baseline viewer display 400.

In block 510, for at least some meter 100 parameters displayed on the baseline viewer display 400, the processor 302 renders an indication 408 of a range of values the parameter may possibly take. Within the range of possible parameter values, the processor 302 overlays a display 410 of the baseline limits 214 for the parameter. The baseline limits indicate a preferred range of values for the parameter. For example, when the parameter value falls within the baseline limits the meter 100 may be considered to be operating normally. The processor 302 also renders an indicator 412, for example a pointer, at a position signifying the value of the parameter.

Inclusion of the baseline viewer in the user interface 210 allows a user to quickly and effectively determine whether the meter 100 is operating within acceptable limits. The flow parameters selected for display in the baseline viewer allow a user to easily identify undesirable flow conditions affecting measurement.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A flow meter validation system, comprising:
an ultrasonic flow meter configured to:
provide information indicative of a parameter of fluid flow through the ultrasonic flow meter; and
store a baseline value that defines a preferred range for the parameter of fluid flow; and
display logic coupled to the ultrasonic flow meter;
wherein the display logic is configured to:
receive from the ultrasonic flow meter:
the baseline value; and
a value of the parameter;
determine a possible range of values of the parameter that exceeds the preferred range of values of the parameter;
determine, based on the baseline value, a baseline portion of the possible range designating preferred upper and lower limit values of the parameter;
determine value of the parameter relative to the possible range and the baseline portion of the possible range; and
provide a display of the information, the display comprising:
an indication of the possible range of values of the parameter;
an indication of the baseline portion of the possible range; and
an indicator of the value of the parameter relative to the indication of the possible range and the indication of the baseline portion of the possible range.

2. The flow meter validation system of claim 1, wherein the display logic is configured to provide user selection of an instantaneous value and an average value of the parameter determined over a predetermined interval for the indicator for presentation in the display.

3. The flow meter validation system of claim 1, wherein the system further comprises a first stored baseline value indicating a preferred range of the parameter for fluid flow in a forward direction, and a second stored baseline value indicating a preferred range of the parameter for fluid flow in a reverse direction.

4. The flow meter validation system of claim 3, wherein the display logic is configured to determine and display a current fluid flow direction, and to determine and display whether the stored baseline value for current fluid flow direction is initialized.

5. The flow meter validation system of claim 1, wherein the information is indicative of a plurality of parameters of fluid flow, and the display logic is configured to simultaneously determine and display, a possible range, baseline portion, and indicator for each parameter.

6. The flow meter validation system of claim 5, wherein a sub-plurality of the parameters is selected from a group consisting of fluid velocity, profile factor, swirl angle, symmetry, cross-flow, and turbulence.

7. The flow meter validation system of claim 1, wherein the system is configured to determine the baseline portion of the possible range based on a value of the parameter at an initialization time during system operation.

8. The flow meter validation system of claim 1, wherein the display logic is configured to provide the display further comprising a numeric value of the parameter.

9. The flow meter validation system of claim 1, wherein the display logic is configured to arrange the indication of possible range as a first bar of a first color and graduation marks disposed at one side of the first bar, the indication of the baseline portion as a second bar of a second color disposed on the first bar, and the indicator as a pointer disposed at a side of the first bar opposite the graduation marks.

10. A non-transitory computer-readable medium encoded with instructions that when executed cause a processor to:
receive, from an ultrasonic flow meter, information indicative of a fluid flow parameter detected by the ultrasonic flow meter, and a baseline value that defines a preferred range for the fluid flow parameter;
determine a possible range of values of the parameter that exceeds the preferred range;
determine, based on the baseline value, a baseline portion of the possible range designating preferred upper and lower limit values of the parameter;
determine value of the parameter relative to the possible range and the baseline portion of the possible range; and
provide a display of the information, the display comprising:
an indication of the possible range of values of the parameter;
an indication of the baseline portion of the possible range designating preferred limits of the values of the parameter; and
an indicator of the value of the parameter relative to the indication of the possible range and the indication of the baseline portion of the possible range.

11. The computer-readable medium of claim 10, further comprising instructions that when executed cause the processor to provide a selection display allowing selection of the indicator to specify either of an instantaneous value of the parameter and an average value of the parameter over a predetermined time interval.

12. The computer-readable medium of claim 10, further comprising instructions that when executed cause the processor to determine and display a current fluid flow direction as being either of a forward and reverse flow direction, and to determine and display an indication of whether a baseline value designating preferred limits for the fluid flow parameter in the current flow direction is initialized.

13. The computer-readable medium of claim 10, further comprising instructions that when executed cause the processor to determine and display a first baseline portion of the possible range based on a forward fluid flow direction, and determine and display a second baseline portion of the possible range based on a reverse fluid flow direction.

14. The computer-readable medium of claim 10, further comprising instructions that when executed cause the processor to display a numeric value of the parameter.

15. The computer-readable medium of claim 10, further comprising instructions that when executed cause the processor to:
receive information indicative of a plurality of fluid flow parameters; and
provide simultaneous display of the information comprising a possible range, baseline portion, and indicator for each parameter.

16. A flow meter user interface, comprising:
a computer, and
a meter validation system that configures the computer to:
receive, from an ultrasonic flow meter, information indicative of a fluid flow parameter detected by the ultrasonic flow meter, and a baseline value that defines a preferred range for the fluid flow parameter;
determine a possible range of values of the parameter that exceeds the preferred range;
determine, based on the baseline value, a baseline portion of the possible range designating preferred upper and lower limit values of the parameter;
determine value of the parameter relative to the possible range and the baseline portion of the possible range; and
provide a display of the information, the display comprising:
an indication of the possible range of values of the parameter;
an indication of the baseline portion of the possible range designating preferred limits of the values of the parameter; and
an indicator of the value of the parameter relative to the indication of the possible range and the indication of the baseline portion of the possible range.

17. The flow meter user interface of claim 16, wherein the meter validation system configures the computer to provide a selection display allowing user selection of the indicator to specify either of an instantaneous value of the parameter and an average value of the parameter over a predetermined time interval.

18. The flow meter user interface of claim 17, wherein the meter validation system configures the computer to determine and provide a display indicating whether the average value of the parameter is valid.

19. The flow meter user interface of claim 16, wherein the meter validation system configures the computer to:
determine and provide in the display an indication of a current fluid flow direction being either of a forward and reverse flow direction; and
determine and provide in the display an indication of whether a baseline value designating preferred limits for the fluid flow parameter in the current flow direction is initialized;
wherein the baseline portion of the possible range corresponds to a first portion of the possible range based on a forward fluid flow direction, and corresponds to a second portion of the possible range based on a reverse fluid flow direction.

20. The flow meter user interface of claim 16, wherein the meter validation system configures the computer to:
render the possible range as a bar of a first color with associated graduation marks along one side of the bar;
render the baseline portion of the possible range as a bar of a second color overlaying the bar of the first color; and
render the indicator as a pointer disposed to the side of the bar of the first color opposite the graduation marks.

* * * * *